Dec. 6, 1960  M. A. OLGIATI  2,962,986
CUTTING AND FORMING ROLL ASSEMBLY FOR BREAD MAKING MACHINE
Filed Dec. 15, 1958
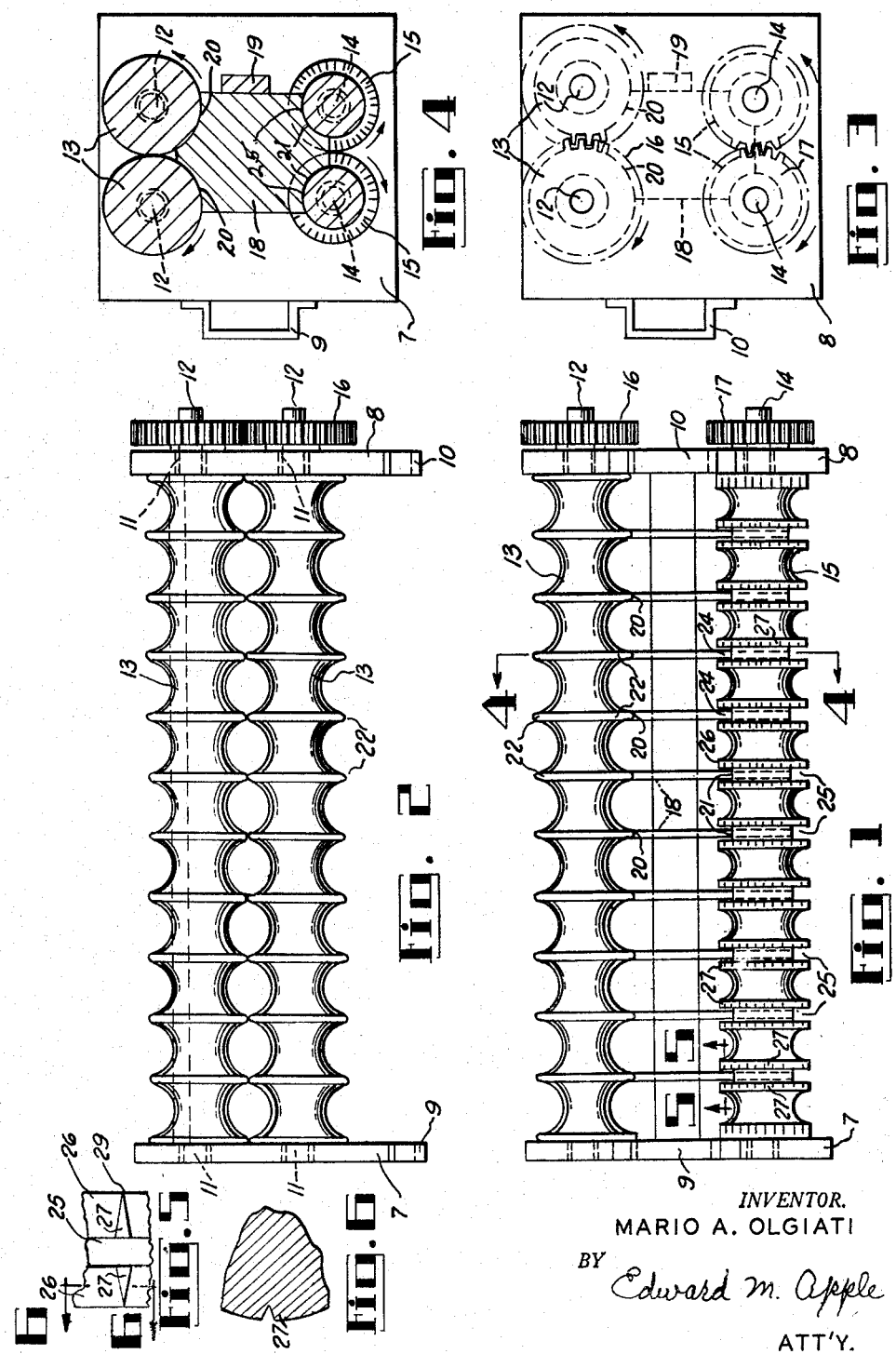
INVENTOR.
MARIO A. OLGIATI
BY Edward M. Apple
ATT'Y.

United States Patent Office 2,962,986
Patented Dec. 6, 1960

2,962,986

CUTTING AND FORMING ROLL ASSEMBLY FOR BREAD MAKING MACHINE

Mario A. Olgiati, 35300 Gratiot Ave., Mount Clemens, Mich.

Filed Dec. 15, 1958, Ser. No. 780,360

3 Claims. (Cl. 107—69)

This invention relates to bread making machinery and has particular reference to a cutting and forming roll assembly, for use with a machine such as disclosed in my co-pending application, Serial No. 780,396, filed December 15, 1958, now Patent No. 2,951,456, dated September 6, 1960.

An object of the invention is to generally improve devices of the character disclosed in the above identified application, and to provide a cutting and forming roll assembly, which may quickly be attached to and detached from the machine without the necessity of using special tools and with the minimum of lost time.

Another object of the invention is to provide means for making a rapid change over from one type of bread production to another, so that it is possible to make a rapid set up of the machine for making bread sticks, rolls, bread loaves, doughnuts or other type of dough product.

Another object of the invention is to provide a cutting and forming roll assembly which may be removed for washing or cleaning of the parts, without the necessity of dismantling or disturbing the other major parts of the machine.

Another object of the invention is to provide improved forming rolls, which have means thereon for gripping the dough passing through the rolls, which means also assist in making more uniform the forming of the dough into predetermined shapes.

Another object of the invention is to provide improved forming rolls, which have a plurality of transversely directed recesses thereon, which allows air to get to the dough passes between the rolls, thereby preventing the dough from sticking to the rolls.

Another object of the invention is to provide improved forming rolls with laterally directed recesses, which make a better seam along the edges of the bread sticks or the like as they are being formed by the rolls.

The foregoing and other objects and advantages will become more apparent as the description proceeds, reference being made from time to time to the accompanying drawing, in which drawing:

Fig. 1 is a side elevational view of a device embodying the invention.

Fig. 2 is a top plan view of the device shown in Fig. 1.

Fig. 3 is a left end elevational view of the device illustrated in Fig. 1.

Fig. 4 is a section taken substantially on the line 4—4 of Fig. 1.

Fig. 5 is a fragmentary plan view taken substantially on the line 5—5 of Fig. 1.

Fig. 6 is a section taken substantially on the line 6—6 of Fig. 5.

Referring now more particularly to the drawing, it will be understood that in the embodiment herein disclosed, the reference characters 7 and 8 indicate a pair of heavy end plates, which are used to support the elements hereinafter described. The end plates 7 and 8 are provided with handles 9 and 10, which assist in manually shifting the assembly into and out of position, in the bread-making machine, when it is desired to change from making one type of bread product to another.

The end plates 7 and 8 are provided with openings 11, for receiving the shafts 12, which support a pair of cutting rolls 13, and the shafts 14, which support a pair of forming rolls 15. Each pair of shafts 12, and each pair of shafts 14, are provided with a pair of meshing drive gears 16 and 17, which are driven through a common source of power (not shown), so that the two pairs of rolls will be driven at a uniform speed, in the directions indicated by the arrows, Figs. 3 and 4.

Positioned between the pairs of rolls 13 and 15, as shown in Fig. 1, is a plurality of comparatively thin wall partitions 18, which are supported by a tie bar 19, which is secured to the end plates 7 and 8, and to each of partitions 18, by welding, or other suitable means. It will be noted that each of the partitions 18 has cutout portions 20 and 21, to permit close peripheral relation with the pairs of rolls 13 and 15. It also will be noted, that the cutouts 20 of the partitions 18, closely engage the edges 22 of the cutting rolls 13, whereas the cutout portions 21 of the partitions 18 are received in grooves 25, formed in the forming rolls 15, so that there is close peripheral relation between the cutout portions 21 and the bottom of the grooves 25 of the forming rolls. With this relation of the parts just described the dough, which is received, in the form of a thin sheet, by the cutting rolls 13, is cut into a plurality of ribbons by the cutting edges 22 of the rolls 13. The narrow strips, or ribbons, of dough then pass from the cutting rolls 13 and are received between the partitions 18 and are directed toward the forming rolls 15, where they are received for the forming operation.

One of the important features of the invention resides in the relation of the partitions 18 to the forming rolls 15, and another important feature of the invention resides in the construction and arrangement of the forming rolls 15 themselves. It will be noted (Figs. 1, 5, and 6), that the edges 26 forming grooves 25 of the forming rolls 15 are provided with transverse recesses 27, which recesses are wider and deeper, where they communicate with the grooves 25 (Fig. 5) and fade away to nothing, as at 29 (Fig. 5), at points removed from the grooves 25. The edges of the recesses 27 serve to grip the dough, to assist in moving it through the forming rolls 15. These recesses 27 further serve to permit air to enter between the edges 26 of the forming rolls, which prevents the dough from sticking to the forming rolls. The edges of these recesses 27 also seal the side edges of the ribbons of dough, as the same pass between the forming rolls 15. When the side edges of the ribbons of dough are sealed as described, openings or pockets cannot be formed along the edges of the ribbons of dough. The sealing just described also reinforces the side edges of the ribbons, preliminary to the ribbons being cut to predetermined lengths, before the baking operation.

It will be understood that the cutting and forming rolls, hereinabove described, are for the making of bread sticks. It is within the contemplation of the invention, however, to provide other types of cutting rolls and forming rolls, for the making of loaves of bread, rolls, or other types of bread products, which cutting and forming rolls will also be assembled and arranged as hereinabove described.

It is believed that the operation of the device is obvious from the foregoing description.

Having described my invention, what I claim and desire to secure by Letters Patent is:

1. A device of the character described comprising in combination, a pair of end plates, a pair of cutting rolls having peripheral cutting edges and a pair of forming rolls having peripheral grooves therein, said rolls being secured for rotation between said plates, means for driving said rolls, a plurality of partitions secured in spaced parallel relation with said end plates, each of said partitions being in alignment with the cutting edges on said cutting rolls and the peripheral grooves of said forming rolls, each of said partitions having cut-outs along opposite sides, certain of said cut-outs being in registry with the cutting edges of the pair of cutting rolls, and others of said cut-outs being in registry with the peripheral grooves of the pair of forming rolls, there being peripheral recesses in said forming rolls in communication with the said peripheral grooves formed in said forming rolls.

2. A pair of cutting rolls and a pair of forming rolls held in spaced relation by a pair of end plates, means connecting said end plates, said cutting rolls having a plurality of peripheral cutting ribs thereon, said forming rolls having a plurality of peripheral grooves thereon, and a plurality of partitions secured to said connecting means and being in alignment with the cutting ribs of the said cutting rolls and being received in said peripheral grooves of said forming rolls, each of said forming rolls having a plurality of peripheral recesses in communication with each of said peripheral grooves.

3. A pair of cutting rolls and a pair of forming rolls held in spaced relation by a pair of end plates, means connecting said end plates, said cutting rolls having a plurality of peripheral cutting ribs thereon, said forming rolls having a plurality of peripheral grooves thereon, and a plurality of partitions secured to said connecting means and being in alignment with the cutting ribs of the said cutting rolls and being received in said peripheral grooves of said forming rolls, each of said forming rolls having a plurality of peripheral recesses in communication with each of said peripheral grooves, each of said peripheral recesses being tapered, and having its larger end in communication with one of said peripheral grooves.

References Cited in the file of this patent

UNITED STATES PATENTS

| | | |
|---|---|---|
| 2,382,657 | Olgiati | Aug. 14, 1945 |
| 2,454,316 | Haecks | Nov. 23, 1948 |
| 2,559,648 | Lindhe | July 10, 1951 |
| 2,693,154 | Appleton | Nov. 2, 1954 |